Sept. 15, 1953     F. R. HANSON ET AL     2,652,356
FUMAGILLIN AND PREPARATION
Filed Sept. 25, 1950     2 Sheets-Sheet 2
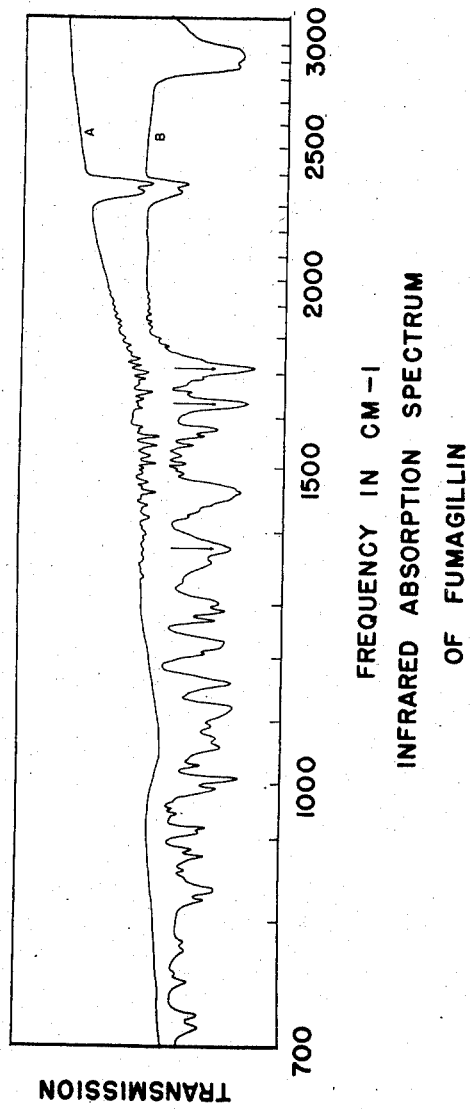
FREDERICK R. HANSON and THOMAS E. EBLE
INVENTORS
BY Eugene H Woodruff
AGENT Patented Sept. 15, 1953

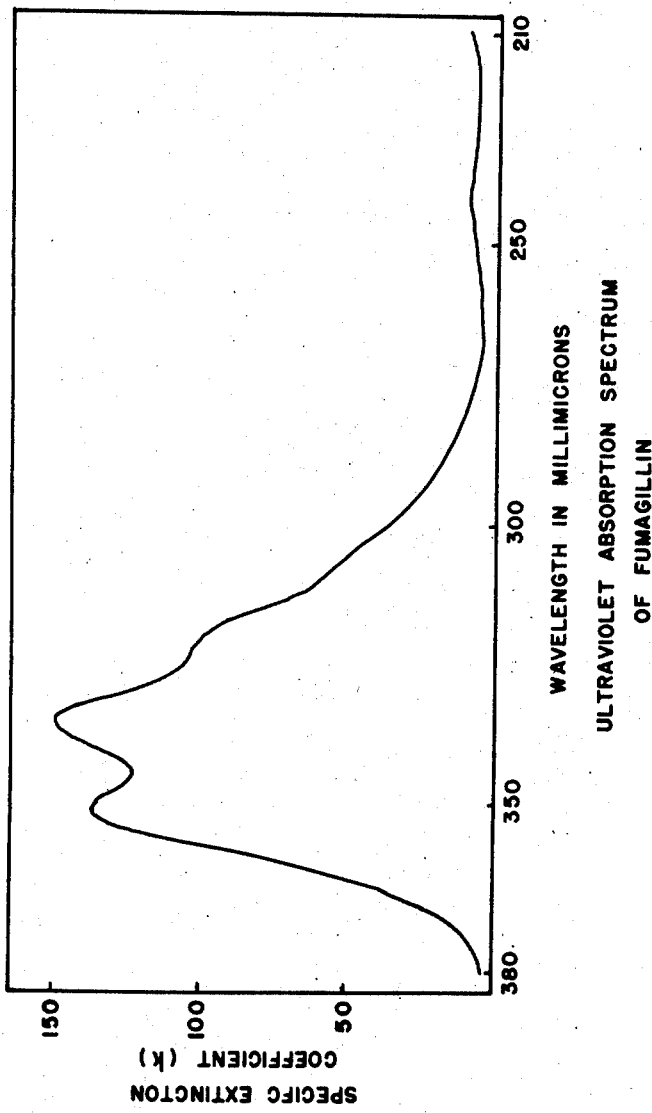

2,652,356

UNITED STATES PATENT OFFICE 2,652,356

FUMAGILLIN AND PREPARATION

Frederick R. Hanson and Thomas E. Eble, Kalamazoo, Mich., assignors to The Upjohn Company, Kalamazoo, Mich., a corporation of Michigan Application September 25, 1950, Serial No. 186,668

8 Claims. (Cl. 167—65)

This invention relates to fumagillin and to a method for its preparation.

The synthesis of chemical compounds having therapeutic properties by the classical procedures of organic chemistry is an old and well established method of adding valuable remedies to the medical armentarium. More recently it has been found that new and unusual chemical substances having efficacies not previously attainable can be isolated from the culture media wherein certain specific microorganisms have been grown under carefully controlled conditions, the media and culture conditions being peculiar to each specific microorganism and to the product produced. These therapeutically useful chemical compounds, without regard to their chemical structure, have been classified in the art as antibiotics on the basis of their method of production and growth inhibiting effect toward microorganisms. Among those antibiotic substances so far isolated and characterized only a few have been found to be effective against viruses or in inhibiting the activity of any bacteriophage.

It is an object of this invention to provide an antibiotic that is effective against viruses. It is an additional object of this invention to provide an antibiotic substance that has anti-bacteriophage activity. It is a further object of this invention to provide an antibiotic substance that is useful in the treatment of infections in animals. Another object of this invention is the provision of an antibiotic that is useful in the treatment of infections in man. It is also an object to provide a method for the preparation of the product of the present invention. Other objects of the invention will become apparent hereinafter.

The new antibiotic substance of the present invention has been found in in vitro studies to be effective against Staphylococcus aureus bacteriophage [Hanson and Eble, J. Bacteriology 58, 527 (October 1949)] and E. histolytica.

Fumagillin is a white, crystalline solid organic carboxylic acid, having a pK, as shown by electrometric titration, of about 6.5 and a melting point of 189–194 degrees centigrade (Kopfler block) or 190–191 degrees centigrade (capillary tube). It is optically active, having an $[alpha]_D^{25}$ of minus 26.6 degrees (C, 0.25 percent in methanol). It contains only the elements carbon, hydrogen and oxygen, has the proximate empirical formula $C_{27}H_{36}O_7$ and contains in addition to a carboxyl group an alkoxyl group. Its molecular weight as calculated from its neutral equivalent is 475 and as calculated from the alkoxyl determination is 488. The crystalline material gives no ferric chloride or Millon's test. The Salkowski sterol test is questionably positive, the Lieberman-Burchard test is negative. Legal's test (aglucones, etc.) is negative. Its ultraviolet absorption spectrum as illustrated in Figure 1 shows peaks at 239, 304 (flex), 332 (flex), 336 and 351 m$\mu$ with "k" values of 7.52 at 239 m$\mu$, 147.8 at 336 m$\mu$ and 136.4 at 351 m$\mu$ which indicate the presence of a conjugated double bond system composed of at least three and possibly four double bonds. The infrared spectrum as illustrated in Figure 2 shows bands at 3120, 1714, 1632, 1597, 1576, 1491, 1377, 1230, 1163, 1124, 1013 and 838 millimicrons. In Figure 2 line A represents background absorption and line B represents the background absorption plus the absorption due to fumagillin. Fumagillin forms a methyl ester, M. P. 145–147 degrees centigrade (Kopfler block); an octabromide, M. P. 118–122 degrees centigrade (Kopfler block); an amide which chars at 160 degrees centigrade (Kopfler); and a 2,4-dinitrophenyl hydrazone, M. P. 123–126 degrees centigrade (Kopfler block).

The organism which produces the new antibiotic substance of the present invention was isolated from soil obtained in Kalamazoo County, Michigan. Cultures of the living organism have been deposited with the Fermentation Division of the Northern Regional Research Laboratory, Peoria, Illinois, and have been added to their permanent collection of microorganisms as culture member NRRL 2319. Structurally and functionally this organism as found in the soil is a member of the Aspergillus fumigatus series of the Aspergillus fumigatus group as defined by Thom and Raper, Manuel of Aspergilli, Williams and Wilkins, Baltimore, Md., 1945, pages 87–91, but is distinct from the type strain A. fumigatus NRRL 163 in several of its morphological characteristics as is shown by the following table.

Table I.—*Morphological comparison of two strains of Aspergillus fumigatus*

| Morphological characteristics | A. fumigatus H-3 | A. fumigatus NRRL 163 (type strain) |
|---|---|---|
| Colony: | | |
| Color (aerial) | White turning to blue-green. | Blue-green. |
| Color (substratum). | Pale olive-buff turning to honey yellow (R). | Seafoam yellow turning to pinkish buff (R). |
| Type of growth. | Spreading, extremely flocose, branching. | Spreading, velvety. |
| Sporulation | Moderate amount originating from aerial hyphae. | Abundant—conidiophores originating from substratum. |
| Conideal head: | | |
| Shape | Compact, columnar | Compact, columnar. |
| Length | 70μ to 200μ | 70–200μ. |
| Diameter | 30μ to 50μ | 50μ–60μ. |
| Conidiophore: | | |
| Length | 150μ to 250μ | 300μ to 350μ. |
| Diameter | 3.5μ to 7.0μ | 4μ to 7μ. |
| Color | Green | Green. |
| Wall | Smooth | Smooth. |
| Vesicle: | | |
| Shape | Flask-shaped, upper half fertile. | Flask-shaped, upper half fertile. |
| Diameter | 12μ to 20μ | 14μ to 25μ. |
| Sterigmata | In one series, crowded, parallel to axis of conidophore. | In one series, crowded, parallel to axis of conidophore. |
| Length | 6μ to 8μ | 5μ to 7μ. |
| Conidia: | | |
| Color | Green | Green. |
| Shape | Globose, echinulate | Globose, echinulate. |
| Diameter | 2.5μ to 3.5μ | 2.5μ to 3.5μ. |

(R in Table I indicates that the color nomenclature is that of Robert Ridgway, "Color Standards and Color Nomenclature," (1912), Washington, D. C.)

In addition to the differences apparent from the above comparison *A. fumigatus* NRRL 163 does not produce an anti-phage substance when cultured under conditions identical with those under which the antibiotic substance of this invention is produced by *A. fumigatus* H-3.

The determination of the presence of the antibiotic of this invention in fermentation liquors as well as the proximate determination of the quantity present in these and other solutions is based on the unique ability of fumagillin to inhibit the action of bacteriophage. For assay purposes the ability of fumagillin to inhibit the action of bacteriophage on the microorganism *Staphylococcus aureus* 209P has been selected as a standard.

The preparation of the necessary solutions and their use in the assay is as follows:

Preparation of the bacteriophage suspension

Each of several flasks containing a suitable quantity of sterile nutrient broth, composed of peptone 0.5 percent, beef extract 0.3 percent, sodium chloride 0.5 percent and water, are inoculated with 0.5 percent by volume of a 24 hour broth culture of *S. aureus* 209 and incubated at 37 degrees centigrade for about seven hours, or until the broth has become turbid. About five percent by volume of an active bacteriophage suspension is then added to each flask and the flasks again incubated at thirty-seven degrees centigrade for about sixteen hours, at which time the turbidity of the broth has either entirely disappeared or is markedly decreased. The contents of the flasks are pooled and the cells removed by filtration using a sterile sintered glass filter, pore size UF. The sterile, filtered, bacteriophage suspension is assayed for activity and stored in a refrigerator for use as desired.

Preparation of test plates

Molten semi-solid nutrient agar, containing peptone, 0.5 percent; beef extract, 0.3 percent; sodium chloride, 0.5 percent; agar, 0.7 percent and water is cooled to about fifty degrees centigrade and mixed with about one percent by volume of a 24-hour broth culture of *S. aureus* 209. A sufficient quantity of the phage suspension prepared as above to prevent the growth of *S. aureus* 209, as determined by the previous assay, is added to the liquid agar suspension. Five milliliters of this *S. aureus* bacteriophage suspension is poured into each of several "flat bottom" Petri plate and allowed to solidify. The plates prepared in this manner are refrigerated until use.

Preparation of standard and samples

A solution in acetone containing 100 micrograms of crystalline fumagillin per milliliter is prepared. Portions of this solution are diluted with sterile distilled water to concentrations of 10, 5, 2.5 and 1.5 micrograms per milliliter. Samples of unknown potency are diluted with acetone and water (the insolubility of purified fumagillin may make it necessary to dilute solutions containing more than 100 micrograms per milliliter with acetone) to yield an estimated concentration falling between 1.25 to 10.0 micrograms per milliliter.

Assay method

A one-quarter inch filter paper pad (Schleicher and Schuell 740–E) is dipped into each concentration of the standard and unknown solutions, the excess liquid allowed to drain and the paper placed on a Petri plate prepared as above. Four pads, each on a separate plate, are usually used for each dilution of the standard and unknown. The plates are incubated at 37 degrees centigrade for 16–18 hours after which the diameter of the zones of growth on each plate is measured in millimeters and the size of the replicate zones for each dilution averaged. Zone size measurements of the standard dilutions are plotted against their concentrations and the points connected by lines, giving a standard curve. Determination of the concentration of a sample of unknown concentration is made using the standard curve to convert the millimeter-diameter reading to its value in micrograms of fumagillin per milliliter.

The antibiotic substance of this invention is prepared by cultivating a fumagillin producing strain *A. fumigatus* H-3 preferably under submerged aerobic conditions, in a nutrient medium containing a carbohydrate, sodium chloride, corn steep solids, calcium carbonate and sufficient sodium hydroxide solution to adjust the final pH of the medium to about 6.7. The fumagillin thus produced can be isolated from the culture medium, preferably after removal of the mycelium, by extraction with chloroform, recovering the crude fumagillin from the chloroform solution and purifying the crude product thus obtained by solution in acetone, concentrating the acetone solution, cooling, separating the resulting precipitate, washing the precipitate with t-butanol and crystallization from methanol and water.

For the preparation of fumagillin, a culture medium which is preferred is one containing approximately:

| | Parts |
|---|---|
| Dextrin | 5–15 |
| Sodium chloride | 1–7 |
| Corn steep solids | 25–40 |
| Calcium carbonate | 1–2 |
| Water q. s. to make 1000 parts. | |

The medium is brought to a pH of approximately 6.7 by addition of sodium hydroxide solution and thereafter is sterilized by heating and then cooled. With this medium it is possible to reach a production of approximately 70 to 170 micrograms per milliliter in from 36 to 72 hours.

For the preparation of large quantities of fumagillin the above medium is inoculated with a culture of an antibiotic H-3 producing strain of *A. fumigatus* H-3 preferably in an amount of about five percent by volume of the nutrient medium. The inoculating culture can be obtained by transferring the fumagillin producing strain of *A. fumigatus* H-3 grown on agar slants to shake flask containing a medium having the composition as described above and after two days growth transferred into sweep stir bottles containing medium as described above where it is allowed to grow for an additional two days.

The fermentation is conducted at 20 to 30 degrees centigrade for from thirty-six to seventy-two hours with the maximum yield being obtained after about 42 hours of incubation. During the fermentation air is passed into the agitated, inoculated medium at a preferred rate of about 0.4 volume of air per volume of medium per minute. After the fermentation has proceeded for the desired length of time, as determined by assay of the brew for fumagillin content, the beer is clarified by filtration. The clarified beer is defatted by extracting with about one-tenth of its volume of commercial hexane. The defatted, clarified beer is then extracted with chloroform. The chloroform extract containing the fumagillin is concentrated to remove all the chloroform and the residue is dissolved in acetone. The acetone solution upon cooling deposits a small brown precipitate consisting of impurities which is removed. The acetone solution is concentrated to about sixty percent of its original volume, cooled and the resulting precipitate containing the antibiotic is removed. The precipitate after washing with tertiary butanol is crystallized from a mixture of methanol and water. There is thus obtained pure fumagillin having the physical properties as previously described.

The following examples are illustrative of the invention but are not to be construed as limiting.

*Example 1.—Preparation of seed cultures of Aspergillus fumigatus H-3*

The vegetative growth and spores of *A. fumigatus* H-3, grown on agar slants, was transferred to several 500 milliliter flasks, each containing 100 milliliters of the following medium.

|   | Grams |
|---|---|
| Dextrin | 10 |
| Sodium chloride | 5 |
| Corn steep solids | 32 |
| Calcium carbonate | 1 |
| Tap water q. s. to make 1 liter. | |

The pH of the medium was adjusted to 6.7 by the addition of sodium hydroxide solution.

This medium was sterilized and inoculated from agar slants. It was shaken (aerated, submerged culture) for 48 hours at a temperature of 24 degrees centigrade. This culture of *A. fumigatus* H-3 can be used directly for the inoculation of antibiotic H-3 producing tanks (Example 3) or for the production of a larger volume of inoculum (Example 2).

*Example 2.—Preparation of inoculum*

To six liters of a medium containing the ingredients listed in Example 1 in a five-gallon flask, equipped for agitation and aeration, was added five percent by volume of a seed culture obtained as described in Example 1. The inoculated medium was incubated at a temperature of 24 degree centigrade, with aeration for a period of 48 hours. At the end of this time, this broth culture is suitable for use to inoculate large tanks.

*Example 3.—Preparation of fumagillin*

A. FERMENTATION

Fifteen hundred gallons of the dextrin-steep medium described in Example 1, contained in a two thousand gallon glass-lined fermentation tank, was inoculated with 75 gallons of a 48 hour vegetative culture of *A. fumigatus* H-3 obtained as described in Example 2. The inoculated medium was incubated for 42 hours at a temperature of 24 degrees with aeration at a rate of about 80 cubic feet per minute and stirring. Assays of a portion of the medium showed that at the end of 42 hours 170 phage units per milliliter were present.

B. ISOLATION

At the end of the fermentation period 150 pounds of a diatomaceous filter aid was added to the contents of the fermentation tank which was then filtered using a plate and frame filter press. The clarified liquid contained 26.6 milligrams of solids per milliliter and assayed 142 phage per milliliter. The clarified liquid was intimately mixed with 177 gallons of commercial hexane, using a Podbielniak extractor and the hexane layer containing undesired fatty material was discarded. The defatted liquid was then extracted with 155 gallons of chloroform. The chloroform layer was separated and contained 1190 grams of solids and 35 grams of fumagillin as shown by assay. The chloroform was removed under reduced pressure without external heating. After the removal of all of the chloroform the residual syrup was dissolved in sufficient acetone to make a volume of 3700 milliliters. The acetone solution was cooled to five degrees centigrade whereupon a small quantity of brown precipitate separated which was removed by filtration. The precipitate was washed with acetone, the washings added to the original filtrate, the combined volume of the filtrate and washing being 3800 milliliters. This solution contained 1062 grams of solids having an anti-phage potency of 300 micrograms per milligram.

A 1500 milliliter portion of the above acetone solution was concentrated under reduced pressure at room temperature under an atmosphere of nitrogen to a volume of 900 milliliters. The resulting thick suspension was placed in a one liter centrifuge cup, under nitrogen, and cooled at minus thirty degrees centigrade for eighteen hours. The suspension was centrifuged for one hour at fifteen hundred to seventeen hundred R. P. M. The supernatant liquid was decanted from the residual solids which were washed five times at room temperature with several 1525 milliliter portions of tertiary butanol. The residual solid material remaining after the tertiary butanol wash after drying at room temperature, amounted to 22.2 grams. This material after recrystallization from five hundred milliliters of a mixture of equal parts and of methanol and water weighed 19.8 grams and had a melting point of 190–191 degrees centigrade when taken in a capillary tube and the other physical and chemical properties previously recited.

*Example 4.—Fumagillin methyl ester*

To a solution of 500 milligrams of fumagillin (M. P. cap. 190-191) from Example 3 dissolved in 500 milliliters of benzene was added and excess of diazomethane dissolved in anhydrous ether. The reaction mixture was cooled to about plus 5 degrees centigrade for thirty minutes and then allowed to stand at room temperature for an additional two hours, the ether and benzene were removed under reduced pressure. The residue was dissolved in seventy milliliters of methanol and thirty milliliters of water added. Upon cooling to plus 5 degrees centigrade crystalline fumagillin methyl ester separated. The crystals of fumagillin methyl ester were collected and after drying weighed 370 milligrams and melted at 145-147 degrees centigrade.

*Analysis.*—Calculated for $C_{28}H_{38}O_7$: C, 69.11; H, 7.86; $(OCH_3)_2$, 12.76. Found: C, 67.8; H, 7.84; $(OCH_3)_2$, 11.55.

The ultraviolet absorption spectrum showed peaks at 238.5 m$\mu$, 336 m$\mu$ and 352 m$\mu$. The infrared spectrum of the methyl ester in chloroform was exceedingly similar to that of the starting acid determined under similar conditions.

*Example 5.—Fumagillin octabromide*

To a solution of one hundred milligrams of fumagillin in a mixture of 2.0 milliliters of chloroform and 0.3 milliliter of carbon tetrachloride 5.0 milliliters of a 5 percent solution of bromine in carbon tetrachloride was added dropwise with stirring at room temperature. The solvents were removed by evaporation in a current of air at room temperature and the residue dissolved in 20 milliliters of methanol to which 5 milliliters of water was then added. Upon cooling to about plus five degrees centigrade yellow crystals of fumagillin octabromide were deposited, which, after collecting and drying, weighed 110 milligrams and melted at 118-122 degrees centigrade on a Kopfler block.

*Analysis.*—Calcd. for $C_{27}H_{36}O_7Br_8$: Br, 57.50; C, 29.16; H, 3.26; $OCH_3$, 2.79. Found: Br, 57.43; C, 29.57; H, 3.60; $OCH_3$, 2.80.

The ultraviolet and infrared absorption spectra showed that the system of conjugated double bonds present in fumagillin has been eliminated.

*Example 6.—Fumagillin di-2,4-dinitrophenyl-hydrazone*

To a solution of 100 milligrams of fumagillin dissolved in 15 milliliters of ethanol was added 75 milligrams of 2,4-dinitrophenyl-hydrazine and the reaction mixture heated to boiling. One milliliter of concentrated hydrochloric acid was added and the solution heated under reflux for an additional five minutes. Upon cooling overnight crystals of fumagillin di-2,4-dinitrophenyl-hydrazone were deposited which after collection and crystallization from methanol weighed 22 milligrams and melted at 123-126 degrees centigrade (Kopfler block).

Ultraviolet and infrared absorption spectra showed the presence of bands of 3285 cm.$^{-1}$, 3100 cm.$^{-1}$, 1618 cm.$^{-1}$, 1596 cm.$^{-1}$, 1505 cm.$^{-1}$, 1520 cm.$^{-1}$, which are characteristic of 2,4-dinitrophenyl-hydrazones and an additional band at 1710 cm.$^{-1}$ indicative of the carbonyl group presumably that of a carboxyl or lactone group present in fumagillin.

*Analysis.*—Calcd. for $$C_{27}H_{36}O_5[NNHC_6H_3(NO_2)_2]_2$$

N, 13.46. Found: N, 13.21.

Inasmuch as the foregoing description comprises preferred embodiments of the invention it is to be understood that modifications and alternations may be made therein in a conventional manner and in accordance with the principles described as will be apparent to those skilled in the art without departing from the spirit and teaching of the present invention.

Having thus described our invention we claim:

1. The white, crystalline, solid, organic acid fumagillin containing only the elements carbon, hydrogen and oxygen, having a pK of about 6.5, melting at 189-194 degrees centigrade (Kopfler block) and 190-191 degrees centigrade (capillary tube), an optical rotation $[\alpha]_D^{25}$ of minus 26.6 degrees, a molecular weight of about 475-490, whose ultraviolet spectrum shows peaks at 239 m$\mu$, 336 m$\mu$ and 351 m$\mu$, with $k$ values of 7.52 at 239 m$\mu$, 147.8 at 336 m$\mu$ and 136.4 at 351 m$\mu$, whose infrared spectrum shows bands at the following frequencies expressed in reciprocal centimeters, 3120, 1714, 1632, 1597, 1576, 1491, 1377, 1230, 1163, 1124, 1013, and 838, forming a methyl ester melting at 145-147 degrees centigrade, an octabromide melting at 118-122 degrees centigrade, an amide charring at 160 degrees centigrade, and a 2,4-dinitrophenylhydrazone melting at 123-126 degrees centigrade.

2. A process of producing fumagillin which comprises the steps of introducing spores and vegetative mycelium of *Aspergillus fumigatus* H-3 in an aqueous nutrient medium containing a carbonaceous substance, corn steep solids as a source of assimilable nitrogen and mineral substances essential for the growth of the organism and, after said aqueous nutrient medium has been fermented by said microorganism within the range twenty degrees centigrade to thirty-five degrees centigrade at a pH between about 6 to about 8, separating the insoluble mycelia from the aqueous solution.

3. A method which comprises the steps of growing the fungus *Aspergillus fumigatus* H-3 in an aqueous solution containing about 10 parts dextrin, about 5 parts sodium chloride, about 32 parts corn steep solids and about 1 part calcium carbonate, and having a pH of between about 6 and about 8 at a temperature of about twenty-four degrees centigrade while aerating the aqueous solution, whereby fumagillin is produced.

4. A process for producing a fumagillin containing fermentation broth comprising cultivating *Aspergillus fumigatus* H-3 in an aqueous, nutrient medium containing carbohydrate, corn steep solids and inorganic salts under aerobic conditions until substantial antibacteriophage activity is imparted to said solution.

5. A process for producing a fumagillin containing fermentation broth comprising cultivating *Aspergillus fumigatus* H-3 in an aqueous nutrient medium containing carbohydrate, corn steep solids and inorganic salts under submerged aerobic growth conditions at a temperature of from about 20 degrees centigrade to about 35 degrees centigrade for a period of from about 36 to about 72 hours.

6. A process for producing fumagillin comprising *Aspergillus fumigatus* H-3 in an aqueous, nu-aqueous, nutrient medium containing carbohydrate, corn steep solids and inorganic salts under submerged aerobic growth conditions at a temperature of from about 20 degrees centigrade to about 35 degrees centigrade for a period of from about 36 to about 72 hours and recovering the so produced fumagillin from the fermentation broth.

7. A process for the preparation of an aqueous solution of fumagillin comprising cultivating *Aspergillus fumigatus* H-3 in an aqueous, nutrient medium containing carbohydrate, corn steep solids and inorganic salts under aerobic conditions until substantial anti-bacteriophage activity is imparted to said solution and a substantial growth of the mycelium of *Aspergillus fumigatus* H-3 is obtained and then separating the mycelium from the antibiotic containing aqueous solution at the pH normally resulting at the end of the cultivation period.

8. A process for the isolation of fumagillin from a clarified fermentation broth containing the same comprising removing fat from the solution by extraction of the broth with hexane followed by extraction of the defatted broth with chloroform, and recovering fumagillin from the chloroform.

FREDERICK R. HANSON.
THOMAS E. EBLE.

References Cited in the file of this patent

UNITED STATES PATENTS

| Number | Name | Date |
|---|---|---|
| 2,482,055 | Duggar | Sept. 13, 1949 |

OTHER REFERENCES

Baron: "Handbook of Antibiotics," pages 118 to 121, published 1950 by Reinhold Publishing Corporation, New York city.

Waksman et al.: Journal Bacteriology 45, March 1943, Two Antagonistic Fungi, *Aspergillus fumigatus* etc., pages 233 to 240.

Liggett et al.: Bacteriological Reviews 12, 4, Corn Steep in Microbiology, December 1948, pages 297 to 311.

Menzel et al.: Article in Journal Biol. Chem., pages 419 to 429, 1944.